Patented July 3, 1934

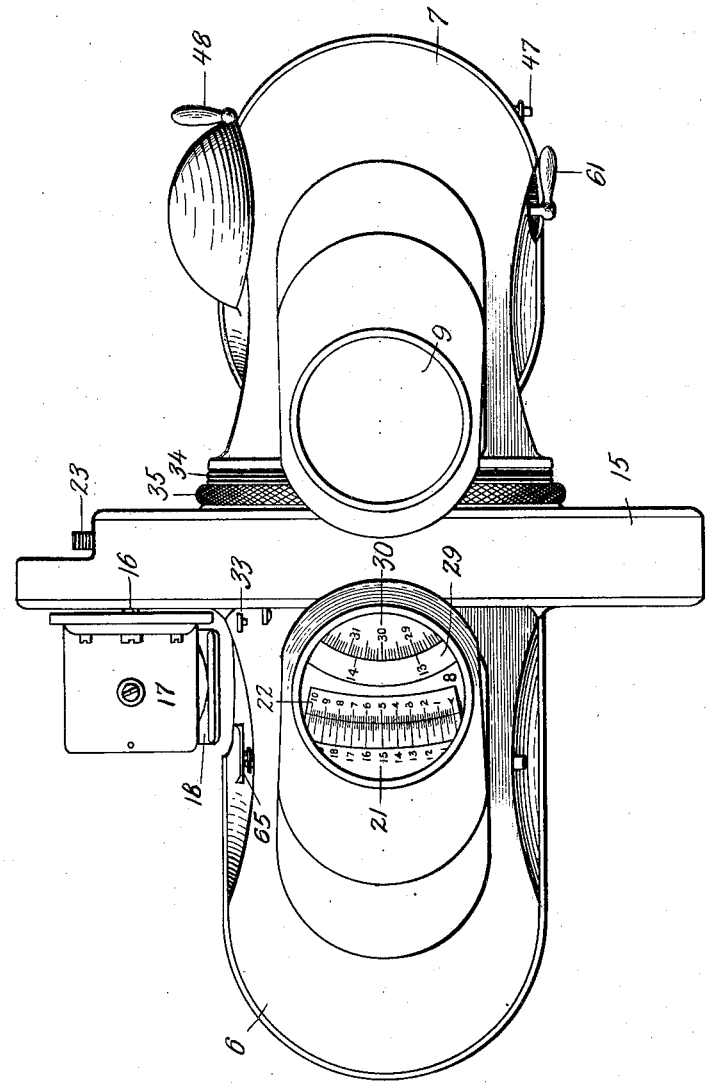

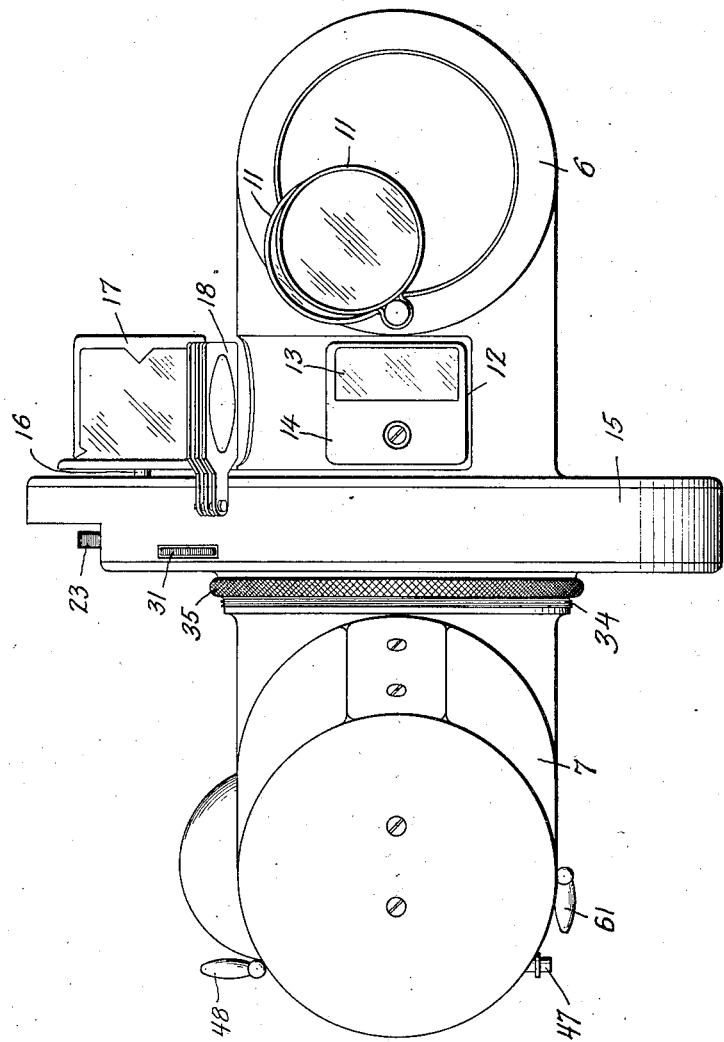

1,964,737

UNITED STATES PATENT OFFICE 1,964,737

GYRO SEXTANT

Scott B. MacFarlane and Robert E. Jasperson,
United States Navy

Application October 25, 1932, Serial No. 639,519

19 Claims. (Cl. 88—2.7)

(Granted under the act of March 3, 1883, as
amended April 30, 1928; 370 O. G. 757)

This invention relates to a gyro sextant, and has for its object to provide an instrument of the type mentioned that is constructed for binocular vision, that is light enough in weight to be easily held to the eyes, that permits reading the altitude of a body being observed and the Greenwich Civil Time simultaneously without removing the instrument from the eyes and to a high degree of accuracy, that has a horizontal reference plane readily visible at night when stars are most easily seen, and that is of rugged construction to withstand hard usage.

With the above and other objects in view, the invention consists in the construction, combination and arrangement of parts as will be described more fully hereinafter.

In the drawings:

Fig. 4 is a rear elevation of our invention;

Fig. 5 is a front elevation thereof;

Fig. 6 is a detail view of the gyro lock.

Figure 1:
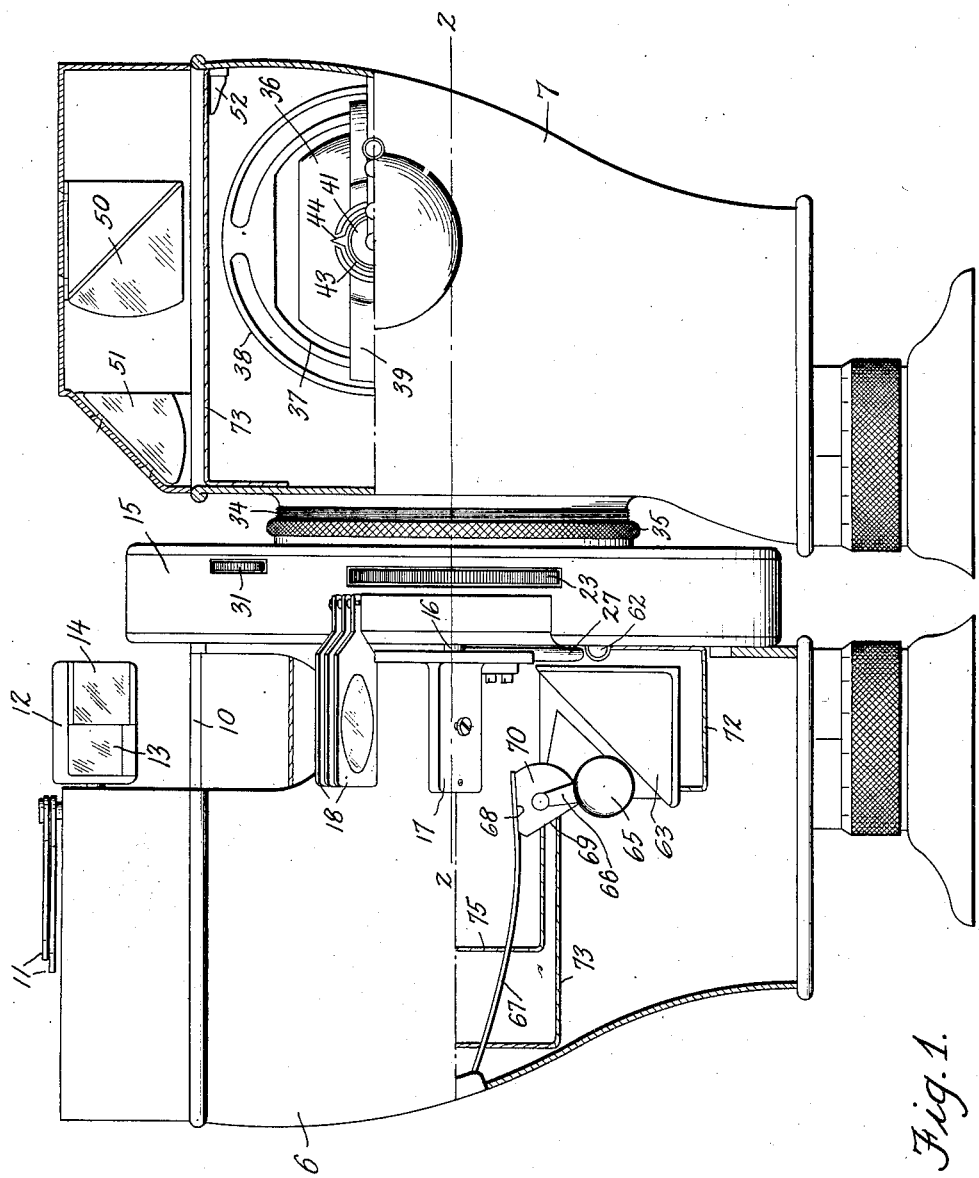
Fig. 1 is a top plan view of our invention with the after portion of the left-hand casing and the forward portion of the right-hand casing shown with the top removed.

We are aware that sextants having a gyroscopically maintained artificial horizon have heretofore been made but their usefulness has been impaired by defects that have seriously limited their accuracy and durability, which shortcomings are avoided in our invention.

The instrument much resembles the ordinary binocular in appearance, having a left-hand casing 6 and a right-hand casing 7 provided with magnifying ocular lenses 8 and 9 that are mounted to be adjustable for adaptation to the eyes of the user. The forward end of casing 6 is apertured at 10 to permit viewing the natural horizon. A horizon glass 12, having a clear portion 13 through which the natural horizon may be seen and a silvered portion 14 to reflect into the instrument an image of a heavenly body, is disposed in front of aperture 10. Ray filters 11 are mounted to be swung before the clear portion 13 to reduce the intensity of glaring light.

Secured to the right-hand side of casing 6 is a housing 15 in which is journaled a shaft 16 upon which an index glass 17 is mounted. Ray filters 18 are mounted on housing 15 to be swingable in front of index glass 17 when taking observations of the sun. Upon a shaft 19 that is journaled in the sides of housing 15 is secured a disk having a raised plane annular portion 20 at its edge upon which is the altitude scale 21. Mounted to lie in the depressed portion of the disk radially inwardly of portion 20 is a vernier scale 22 disposed in close juxtaposition to the inner edge of scale 21. A disk 23 having a milled or knurled edge is fixed upon shaft 19 in driving connection therewith and projects somewhat through a slot in the upper portion of housing 15. Disk 23 is adapted to be turned by the middle finger of the right hand of the person using the instrument to set index glass 17 that is connected to shaft 19 by a train of gears 24, 25 and 26, the former being mounted upon shaft 19 and the latter upon shaft 16. It may be found desirable, to eliminate lost motion, to substitute friction disks held firmly in contact with each other by means of springs for the gears 24, 25 and 26. The annular altitude scale 21 is divided into ninety divisions, each representing one degree, and each of these is in turn subdivided into 10' divisions, which may be read by the vernier scale 22 to 10" of arc. The ratios of gears 24, 25 and 26 are such that turning disk 23 through one of the one degree divisions of scale 21 imparts to index glass 17 a rotation corresponding to one degree of altitude. Distributing the ninety degrees calibration around a complete circle on scale 21 gives a larger arc per degree and hence makes for much more accurate reading of altitude. For fine setting of the altitude scale, the shaft 19 may be turned by means of a small pinion 31 that projects slightly from housing 15 and is meshed with a gear 32 fixed upon shaft 19.

Mounted in casing 6 is a watch 27 whereof the dial is covered except for a small window adjacent vernier 22 covered by a glass bearing a reference line 28. This watch has an annular scale 29 divided into twenty-four equal parts carried by the shaft upon which the hour hand is ordinarily mounted and radially within that a dial 30 that is graduated in sixty equal parts each of which is subdivided into ten equal parts, the dial being mounted upon the shaft that ordinarily carries the minute hand. The watch 27 need not be extremely accurate as it may be compared with the chronometer at the time of taking a reading. The time shown by this watch is Greenwich Civil Time. It is wound and set by means of the stem 33.

Right-hand casing member 7 has a threaded portion 34 that is engageable by the internal threads in a knurled ring 35 that has a radially inwardly extending flange at its inner edge to seat against an outwardly extending flange on the casing 6 whereby the two casing members are held in assembled relation. The distance between the eye-pieces is thus adjustable to the inter-pupillary distance of the observer's eyes. Suitable interlocking portions are provided on the two casing members to insure proper alignment thereof.

A slightly pendulous gyroscopic wheel is rotatable in case 36 (Fig. 2) with its spin axis horizontal. Case 36 is mounted in a double gimbal ring having an inner member 37 and an outer member 38 (Fig. 1), the former being pivotally mounted in a vertical gimbal ring 39 that is freely suspended by a hollow stem 40 connected to a plate 41 that moves on anti-friction bearings 42 in a race 43 carried by a rocking support 44 on bridge piece 45 fixed to casing 7.

The gyro element is similar in construction to the well known air-sustained gyro employed in torpedoes and is driven by air introduced through a double ball and socket nozzle 46 from a flexible air supply hose 47 controlled by a valve 48. The air from nozzle 46 may be conducted to the gyro driving element in any suitable manner, but preferably through stem 40 and ring 39, thence through the spin axis of the gyro wheel to avoid any connections that would introduce errors into the functioning of the gyro. A fine horizontal reference line 49 is etched on the outer side of member 38 and is viewed in the right-hand eye-piece by reflection from reflecting prisms 50 and 51. The line 49 is illuminated by a lamp in reflector 52. Horizontal line 53 is etched on the inner face of prism 50 to indicate when the instrument is being properly held in the vertical plane passing through the observer and the heavenly body being observed. The gyro wheel may be driven by compressed air at a pressure of about fifty pounds per square inch from a small tank carried suspended from the neck or shoulder of the observer, or if used on an aircraft the air stream may be derived from a Venturi nozzle.

When not in use, the gyro is locked by a pin 54 mounted in outer gimbal ring 39 and having a conical end 55 adapted to be moved into engagement with a correspondingly shaped recess in gyro casing 36. Pin 54 is urged outwardly by expansible spring 56 disposed between a plate 57 fixed to ring 39 and a disk 58 secured to the pin, and is retained in the locking position by a lug 59 that extends laterally from pin 54 that is movable, by rotation of the pin, into a slot 60 in ring 39. A handle 61 is provided to manipulate the pin 54.

Figure 2:
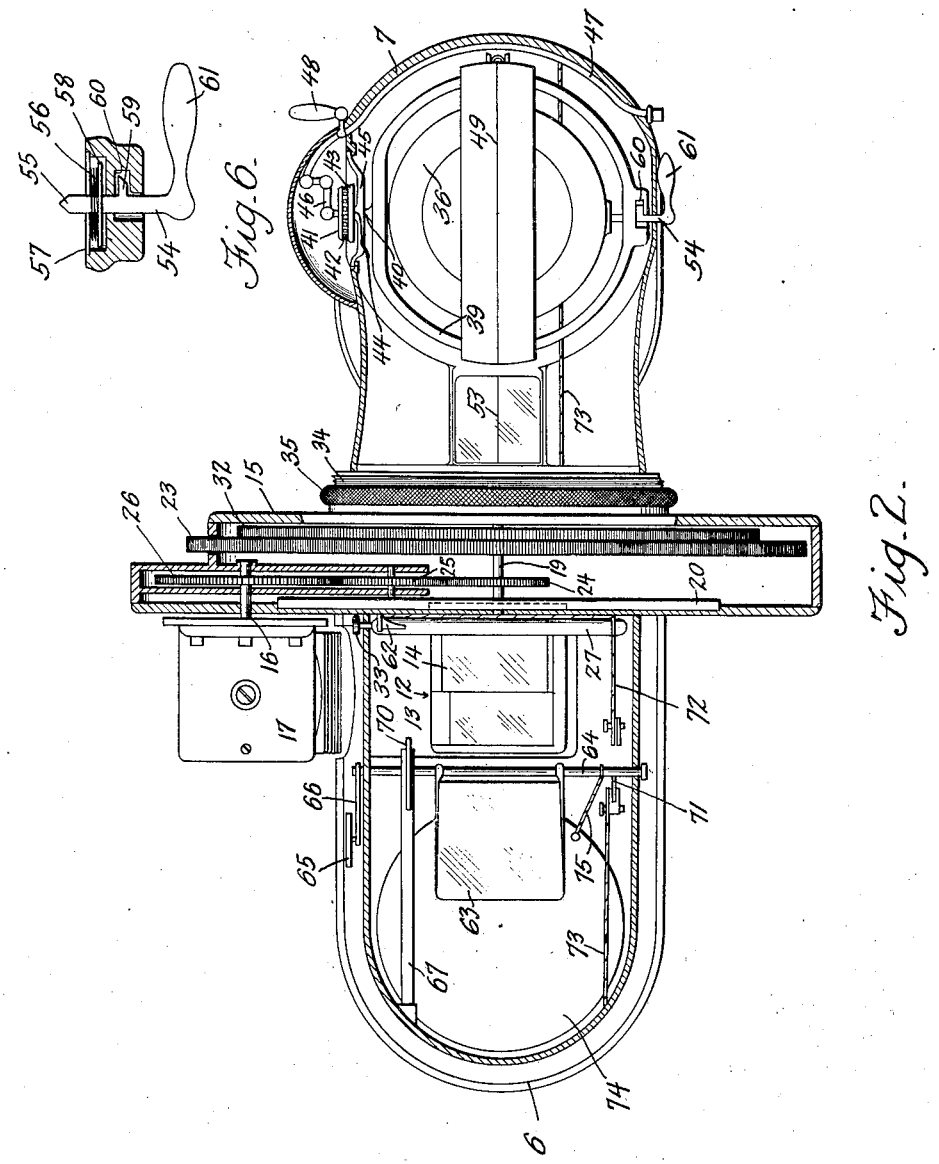
Fig. 2 is a transverse section of the instrument.
Figure 3:
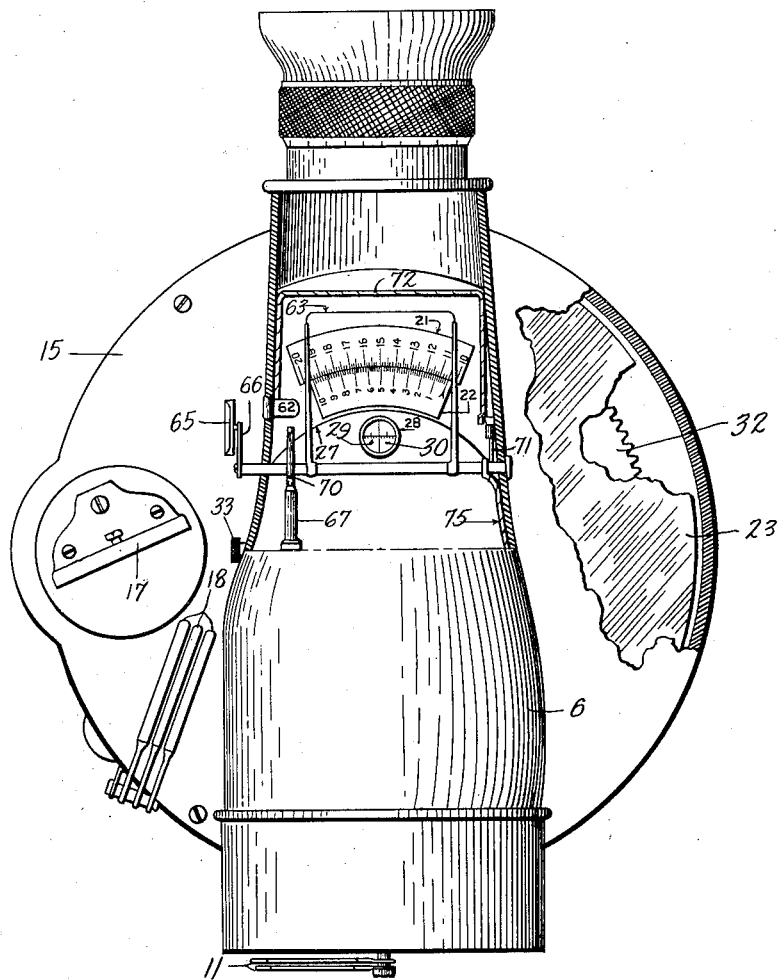
Fig. 3 is a left side elevation with a portion of the casing removed.

The dials of watch 27 and altitude scale 21 are illuminated by a light in reflector 62 and the readings thereof are made visible in the left-hand eye-piece by reflection from prism 63 when in the position shown in Fig. 1. The prism 63 is mounted upon rotatable shaft 64 and may be moved to the "out" position shown in Fig. 2 by placing the index finger of the left hand on plate 65 that is connected to shaft 64 by arm 66 and rotating the shaft. Prism 63 is retained in either the "in" position (Fig. 1) or the "out" position (Fig. 2) by pressure of a flat spring 67 against the faces 68 and 69, respectively, of a cam 70 carried by shaft 64. A switch blade 71 is fixed to shaft 64 to close a circuit to the lamp in reflector 62 through wire 72 when the prism is "in" and to the lamp in reflector 52 through wire 73 when the prism is "out". The shaft is electrically connected to a small electric battery 74 by a wire 75.

The mode of operation is as follows:

With prism 63 "out", the gyro wheel stopped and case 36 locked by pin 54, set scale 21 to zero; compare watch 27 with the chronometer and set it to read Greenwich Civil Time.

Raise the instrument until the real and reflected images of the heavenly body to be observed appear in the left eye-piece. Rotate disk 23 to tilt index glass 17 to bring the real and reflected images into coincidence, throw prism 63 "in" and note on scale 21 the index correction. Turn prism 63 out of the field of view and lower the instrument to approximately the horizontal position while keeping the reflected image of the observed body in the field of view.

Using the index finger of the right hand, open valve 48. Keep a light touch on the locking lever 61 with the right thumb while the gyro builds up to speed and finally takes charge; when it is felt that the gyro element is truly perpendicular, i. e., pin 54 is not touching the bottom of casing 7 at any point, move lever 61 with the right thumb to unlock the gyro. The gyro is then spinning freely in space with its spin axis in a true horizontal plane which holds the line 49 in a horizontal plane likewise. Set the instrument to produce coincidence between the reflected image of the heavenly body and the horizontal reference line 49. Turn prism 63 to the "in" position, thereby connecting wire 72 to battery 74 to illuminate the altitude scale 21 and the dials of watch 27 which are then read by reflection from prism 63. Coincidence should be made several times and the average of the readings so obtained taken. When the observation is finished, close valve 48 and lock the gyro. The instrument may be attached to a strap around the neck of the observer and allowed to rest upon the chest when not in use.

It is to be noted that with this instrument the reading of the altitude scale may be made simultaneously with that of the Greenwich Civil Time. The calibrations on the altitude scale and on the watch dials may be made very fine, yet they can be read accurately due to being magnified by the ocular, which also serves to magnify the image of the observed object.

It will be understood that the above description and accompanying drawings comprehend only the general and preferred embodiment of our invention, and that various changes in construction, proportion and arrangement of parts may be made within the scope of the appended claims without sacrificing any of the advantages of this invention.

The invention described herein may be manufactured and used by or for the Government of the United States of America for governmental purposes without the payment of any royalty thereon.

We claim:

1. A gyro sextant, comprising a first and a second casing, adjustable connecting means therebetween, an eye-piece adjustable for focus connected to each of said casings, said second casing having an aperture in its forward end, a horizon glass having a clear portion and a reflecting portion disposed in front of said aperture, light filters mounted to be swingable between said glass and said aperture, a watch mounted in said second casing having an hour dial calibrated in twenty-four divisions and a minute dial adjacent thereto and concentric therewith calibrated in sixty divisions, a cover over said dials, a window in said cover through which a portion of said dials is visible and having a reference line thereon, a housing at one side of said second casing, a shaft journaled therein, an annular altitude scale divided into ninety equal parts on said shaft and having a portion visible adjacent said window, a vernier scale disposed to aid in reading said altitude scale, a reflecting index glass rotatably mounted on said housing to reflect light to said horizon glass, light filters movable in front of said index glass, gearing connecting said index glass with said shaft in such ratio that the altitude of a body seen in the second eye-piece by reflection from the index glass and the horizon glass is correctly indicated in degrees on the altitude scale, coarse and fine adjustment means to rotate said shaft, a reflecting prism mounted to be swingable to read said watch and said altitude scale through the second eye-piece by reflection from said prism, a shaft on which said prism is mounted, means to rotate said prism shaft, a first gimbal ring in the first casing, antifriction means for suspending said gimbal to rotate freely on a vertical axis, horizontal pivotal mounting means for said anti-friction means carried by the right-hand casing, a double horizontal gimbal ring having an inner portion pivotally mounted in said first gimbal and a horizon line on the outer surface of the outer portion thereof, a gyroscope mounted in said double gimbal with its spin axis horizontal, means to lock the gyro to the first gimbal, reflecting prisms in the forward end of the first casing to reflect an image of the said horizon line to the first eye-piece, one of said prisms having a horizontal reference line thereon, means to illuminate said horizon line adjacent one of said prisms, other means to illuminate said altitude scale and the window of said watch, and means connected to the prism shaft to cause lighting of the first mentioned illuminating means when said swingable prism is not in position to read said watch and altitude scale and to light said second mentioned illuminating means when said swingable prism is in position to read said scale and said watch.

2. A gyro sextant, comprising a first and a second casing, adjustable connecting means therebetween, an eye-piece adjustable for focus connected to each of said casings, said second casing having an aperture in its forward end, a horizon glass having a clear portion and a reflecting portion disposed in front of said aperture, light filters mounted to be swingable between said glass and said aperture, a watch mounted in said second casing having an hour dial calibrated in twenty-four divisions and a minute dial adjacent thereto and concentric therewith calibrated in sixty divisions, a cover over said dials, a window in said cover through which a portion of said dials is visible and having a reference line thereon, a housing at one side of said second casing, a shaft journaled therein, an annular altitude scale divided into ninety equal parts on said shaft and having a portion visible adjacent said window, a vernier scale disposed to aid in reading said altitude scale, a reflecting index glass rotatably mounted on said housing to reflect light to said horizon glass, light filters movable in front of said index glass, gearing connecting said index glass with said shaft in such ratio that the altitude of a body seen in the second eye-piece by reflection from the index glass and the horizon glass is correctly indicated in degrees on the altitude scale, coarse and fine adjustment means to rotate said shaft, a reflecting prism mounted to be swingable to read said watch and said altitude scale through the second eye-piece by reflection from said prism, a shaft on which said prism is mounted, means to rotate said prism shaft, a gyro mounted in the right-hand casing, means to support said gyro for freedom in three planes, an artificial horizon line on part of said means, means connected to the swingable prism shaft to illuminate either said horizon line or said watch and altitude scale depending upon the position of said prism, and means to reflect an image of a portion of said horizon line to the first eye-piece.

3. A gyro sextant, comprising a first and a second casing, adjustable connecting means therebetween, an eye-piece adjustable for focus connected to each of said casings, said second casing having an aperture in its forward end, a horizon glass having a clear portion and a reflecting portion disposed in front of said aperture, light filters mounted to be swingable between said glass and said aperture, a watch mounted in said second casing having an hour dial calibrated in twenty-four divisions and a minute dial adjacent thereto and concentric therewith calibrated in sixty divisions, a cover over said dials, a window in said cover through which a portion of said dials is visible and having a reference line thereon, a housing at one side of said second casing, a shaft journaled therein, an annular altitude scale divided into ninety equal parts on said shaft and having a portion visible adjacent said window, a vernier scale disposed to aid in reading said altitude scale, a reflecting index glass rotatably mounted on said housing to reflect light to said horizon glass, light filters movable in front of said index glass, gearing connecting said index glass with said shaft in such ratio that the altitude of a body seen in the second eye-piece by reflection from the index glass and the horizon glass is correctly indicated in degrees on the altitude scale, coarse and fine adjustment means to rotate said shaft, a reflecting prism mounted to be swingable to read said watch and said altitude scale through the second eye-piece by reflection from said prism, a shaft on which said prism is mounted, means to rotate said prism shaft, gyro stabilized means in said first casing, there being a horizon line on said means, means to illuminate a portion of said line, means to illuminate said watch window and said altitude scale, and means for viewing the illuminated portion of said line through the first eye-piece.

4. A sextant, comprising a first and a second casing, adjustable connecting means therebetween, an eye-piece adjustable for focus connected to each of said casings, said second casing having an aperture in its forward end, a horizon glass having a clear portion and a reflecting portion disposed in front of said aperture, light filters mounted to be swingable between said glass and said aperture, a watch mounted in said second casing having an hour dial calibrated in twenty-four divisions and a minute dial adjacent thereto and concentric therewith calibrated in sixty divisions, a cover over said dials, a window in said cover through which a portion of said dials is visible and having a reference line thereon, a housing at one side of said second casing, a shaft journaled therein, an annular altitude scale divided into ninety equal parts on said shaft and having a portion visible adjacent said window, a vernier scale disposed to aid in reading said altitude scale, a reflecting index glass rotatably mounted on said housing to reflect light to said horizon glass, light filters movable in front of said index glass, gearing connecting said index glass with said shaft in such ratio that the altitude of a body seen in the second eye-piece by reflection from the index glass and the horizon glass is correctly indicated in degrees on the altitude scale, coarse and fine adjustment means to rotate said shaft, a reflecting prism mounted to be swingable to read said watch and said altitude scale through the second eye-piece by reflection from said prism, a shaft on which said prism is mounted, means to rotate said prism shaft, a freely movable member in the first casing bearing an artificial horizon line, means for stabilizing the member bearing said line, and means for viewing a portion of said line through the first eye-piece.

5. A gyro sextant, comprising a first and a second casing, adjustable connecting means therebetween, an eye-piece carried by each of said casings, a bridge piece carried by the upper portion of the right-hand casing, an anti-friction bearing rockably supported on said bridge piece, a first gimbal ring suspended from said bearing, a double gimbal having an outer portion and an inner portion whereof the latter is pivotally connected to the first gimbal, there being a horizon line on the exterior surface of said outer portion thereof, a gyro pivotally mounted in said double gimbal with its spin axis horizontal, means carried by said first gimbal to lock said gyro, means to apply propulsive energy to said gyro, means to illuminate a portion of said horizon line, reflecting means to form an image of the illuminated portion of said line to be viewable through the first eye-piece, a horizon glass mounted at the forward end of the second casing and viewable through the second eye-piece, said horizon glass having a clear portion for viewing the natural horizon and a reflecting portion, an index glass rotatably mounted to reflect light to said horizon glass, an altitude scale mounted at the side of the second casing and operatively connected to said index glass to show the altitude in degrees of a body observed by reflection from said index glass and said horizon glass, a timepiece mounted adjacent a portion of said scale, and means movable to reflect an image of the reading of said scale and of said watch to the second eye-piece.

6. A gyro sextant, comprising a first and a second casing, adjustable connecting means therebetween, an eye-piece carried by each of said casings, a bridge piece carried by the upper portion of the right-hand casing, an anti-friction bearing rockably supported on said bridge piece, a first gimbal ring suspended from said bearing, a double gimbal having an outer portion and an inner portion whereof the latter is pivotally connected to the first gimbal, there being a horizon line on the exterior surface of said outer portion thereof, a gyro pivotally mounted in said double gimbal with its spin axis horizontal, means carried by said first gimbal to lock said gyro, means to apply propulsive energy to said gyro, means to illuminate a portion of said horizon line, reflecting means to form an image of the illuminated portion of said line to be viewable through the first eye-piece, reflecting means at the forward end of said second casing viewable through the second eye-piece, angularly adjustable reflecting means mounted above said second casing to reflect light to the first mentioned reflecting means, an altitude scale in said second casing, means operatively connecting the altitude scale and the adjustable reflecting means to cause the scale to indicate the angular elevation of the source of light reflected to the first mentioned reflecting means by the adjustable reflecting means, and a timepiece disposed adjacent said scale to be readable simultaneously with said scale.

7. A gyro sextant, comprising a first and a second casing, adjustable connecting means therebetween, an eye-piece carried by each of said casings, a bridge piece carried by the upper portion of the right-hand casing, an anti-friction bearing rockably supported on said bridge piece, a first gimbal ring suspended from said bearing, a double gimbal having an outer portion and an inner portion whereof the latter is pivotally connected to the first gimbal, there being a horizon line on the exterior surface of said outer portion thereof, a gyro pivotally mounted in said double gimbal with its spin axis horizontal, means carried by said first gimbal to lock said gyro, means to apply propulsive energy to said gyro, means to illuminate a portion of said horizon line, reflecting means to form an image of the illuminated portion of said line to be viewable through the first eye-piece, reflecting means at the forward end of said second casing viewable through the second eye-piece, angularly adjustable reflecting means mounted above said second casing to reflect light to the first mentioned reflecting means, an altitude scale in said second casing, means operatively connecting the altitude scale and the adjustable reflecting means to cause the scale to indicate the angular elevation of the source of light reflected to the first mentioned reflecting means by the adjustable reflecting means, and means carried by the second casing to determine the angular elevation of a source of light simultaneously with observation of said horizon line.

8. In a sextant, a casing having an aperture in its forward end, an eye-piece mounted on the after portion of said casing, a horizon glass mounted before said aperture having a clear portion for directly viewing the horizon and a reflecting portion, a time measuring device in said casing having an hour dial calibrated in twenty-four divisions and a minute dial adjacent thereto and concentric therewith calibrated in sixty divisions, a cover over said dials, a window in said cover through which a portion of said dials is visible and having a reference line thereon, a housing at one side of said casing, a shaft journaled therein, an annular altitude scale on said shaft having a portion visible adjacent said window, a reflecting index glass rotatably mounted on said housing to reflect light to said horizon glass, gearing connecting said index glass with said shaft in such ratio that the altitude of a body seen in the eye-piece by reflection from said index glass and said horizon glass is correctly indicated in degrees on the altitude scale, means to rotate said shaft, and means for indirectly reading said scale and said time measuring device.

9. In a sextant, a casing, an eye-piece carried by the after portion thereof, a horizon glass mounted at the forward end thereof to be viewable through said eye-piece and having a clear portion for observing the horizon and a reflecting portion, an altitude scale in said casing, a rotatable index glass on said casing adapted to reflect light to said horizon glass, means operatively connecting said index glass and said scale to cause said scale to indicate the angular altitude of a body viewed through said eye-piece by reflection from said index glass and said horizon glass, a timepiece disposed adjacent said scale, and means for reading indirectly the said timepiece and said scale.

10. In a sextant, a casing, an eye-piece carried by the after portion thereof, a horizon glass mounted at the forward end thereof to be viewable through said eye-piece and having a clear portion for observing the horizon and a reflecting portion, an altitude scale in said casing, a rotatable index glass on said casing adapted to reflect light to said horizon glass, means operatively connecting said index glass and said scale to cause said scale to indicate the angular altitude of a body viewed through said eye-piece by reflection from said index glass and said horizon glass, and a timepiece disposed adjacent said scale to be readable simultaneously therewith.

11. In a sextant, a casing, a horizon glass at the forward end thereof viewable therethrough, said glass having a clear portion for observing the horizon and a reflecting portion, an index glass disposed to reflect light to said horizon glass, an annular altitude scale in said casing, means connecting said scale and said index glass whereby the scale is caused to indicate the relative angular position of said index glass, a timepiece disposed adjacent said scale, said timepiece having an annular hour scale calibrated in twenty-four divisions and a minute dial concentric therewith and adjacent thereto calibrated in sixty divisions, means carrying a reference line for reading said timepiece, and means for reading said timepiece and said altitude scale simultaneously.

12. In a sextant, a casing, a horizon glass at the forward end thereof viewable therethrough, said glass having a clear portion for observing the horizon and a reflecting portion, an index glass disposed to reflect light to said horizon glass, an altitude scale in said casing, means connecting said scale and said index glass whereby the scale is actuated to indicate the angular elevation of a body observed by means of said index glass and the reflecting portion of said horizon glass, and a timepiece disposed to be readable simultaneously with said scale.

13. In a sextant, a casing, a horizon glass at the forward end thereof viewable therethrough, said glass having a clear portion for observing the horizon and a reflecting portion, an index glass disposed to reflect light to said horizon glass, an annular altitude scale in said casing, means connecting said scale and said index glass whereby said scale is caused to indicate the angular elevation of a body observed by means of said index glass and the reflecting portion of said horizon glass, and reflecting means in said casing movable to read said scale along a line of sight substantially parallel to said scale and movable out of the line of sight while setting said scale.

14. In a sextant, a casing, a horizon glass at the forward end thereof viewable therethrough, said glass having a clear portion for observing the horizon and a reflecting portion, an index glass disposed to reflect light to said horizon glass, an altitude scale in said casing, means connecting said scale and said index glass whereby said scale is actuated to indicate the angular elevation of a body observed by means of said index glass and the reflecting portion of said horizon glass, and reflecting means in said casing movable to read said scale along a line of sight substantially parallel to said scale and movable out of the line of sight while setting said scale.

15. A gyro sextant, comprising a first casing and a second casing, gyroscopic means in said first casing bearing an artificial horizon line, means for viewing said line, a horizon glass mounted on the second casing to be viewable therethrough and having a reflecting portion, an index glass disposed to reflect light to said horizon glass, an annular altitude scale in the second casing, means connecting said index glass and casing, means connecting said index glass and the altitude scale whereby the scale is caused to indicate the angular elevation of a body viewed by means of said index glass and said horizon glass, a timepiece disposed adjacent said altitude scale to be readable simultaneously therewith, and means for reading indirectly said timepiece and said altitude scale.

16. A sextant, comprising a stabilized member bearing an artificial horizon line, means for observing said line, means associated therewith for measuring and indicating the angular elevation of a body above said horizon line, time indicating means disposed adjacent the indicating portion of said last mentioned means to be readable simultaneously therewith and reflecting means mounted to be swingable into the line of sight whereby to read said time indicating means and said angle indicating means or out of said line of sight while setting the instrument.

17. In a sextant, a casing, a horizon glass at the forward end thereof viewable therethrough, said glass having a clear portion for observing the horizon and a reflecting portion, an index glass disposed to reflect light to said horizon glass, an altitude scale in said casing, means connecting said scale and said index glass whereby said scale is actuated to indicate the angular elevation of a body observed by means of said index glass and the reflecting portion of said horizon glass, gyroscopically stabilized means bearing a reference line for measuring said elevation and means for viewing said line with one eye simultaneously with viewing the image of said body with the other eye whereby the said image is apparently superposed on said line.

18. In a sextant, a casing, a horizon glass at the forward end thereof viewable therethrough, said glass having a clear portion for observing the horizon and a reflecting portion, an index glass disposed to reflect light to said horizon glass, an altitude scale in said casing, means connecting said scale and said index glass whereby said scale is actuated to indicate the angular elevation of a body observed by means of said index glass and the reflecting portion of said horizon glass, stabilized means bearing a reference line for measuring said elevation and means for viewing said line with one eye simultaneously with viewing the image of said body with the other eye whereby the said image is apparently superposed on said line.

19. A gyro sextant, comprising a first casing and a second casing, a horizon glass mounted on the first casing to be viewable therethrough and having a reflecting portion, an index glass disposed to reflect light to said horizon glass, an annular altitude scale in the first casing, means connecting said index glass and the altitude scale whereby the scale is caused to indicate the angular elevation of a body viewed by means of said index glass and said horizon glass, gyroscopic means in said second casing bearing an artificial horizon line and means for viewing said line with one eye simultaneously with viewing the image of said body whereby the image of the body is apparently superposed on said line.

SCOTT B. MacFARLANE.
ROBERT E. JASPERSON.